United States Patent

[11] 3,567,007

[72] Inventor Akira Maeda, Iwata, Japan
[21] Appl. No. 759,060
[22] Filed Sept. 11, 1968
[45] Patented Mar. 2, 1971
[73] Assignee The Toyo Bearing Manufacturing Company Limited, Osaka, Japan

[54] APPARATUS FOR ALIGNING AND CONVEYING RIVETS, SCREWS, BOLTS AND THE LIKE
2 Claims, 6 Drawing Figs.

[52] U.S. Cl. .................................................. 198/33
[51] Int. Cl. ............................................... B65g 47/24
[50] Field of Search ........................................ 198/33.1; 221/167, 162

[56] References Cited
UNITED STATES PATENTS
1,692,456  11/1928  Lynch et al. .................. 221/162
2,781,885  2/1957  Taylor ............................ 198/33(.1)

Primary Examiner—Robert G. Sheridan
Attorney—Wenderoth, Lind and Ponack

ABSTRACT: A method and apparatus for aligning and conveying small articles such as rivets, bolts, screws and the like. A table is mounted on a frame for reciprocable movement in a generally horizontal direction, said table having a plurality of longitudinally extending grooves therein adapted to receive at least a part of the articles being aligned and conveyed in the desired position. A roller is rotatably mounted above said table with the axis of rotation extending across said grooves with the surface of said roller being spaced from the grooved surface of said table a distance such that only articles properly positioned in said grooves can pass beneath said roller. While the table is reciprocated to move the articles in the spaced direction, said roller is rotated with the peripheral surface of the roller adjacent the grooved surface of the table moving in a direction opposite to the desired conveying direction to impell articles not in the grooves backwards on the table.

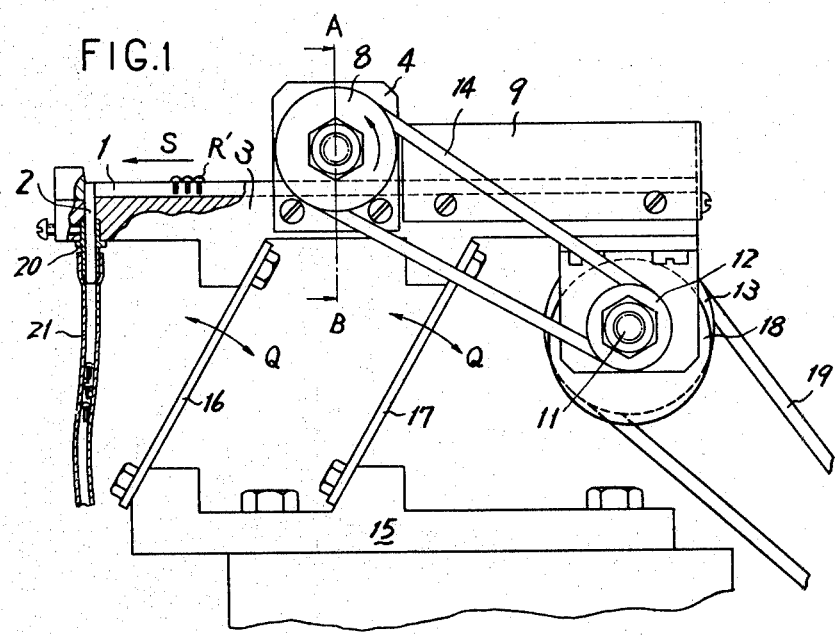
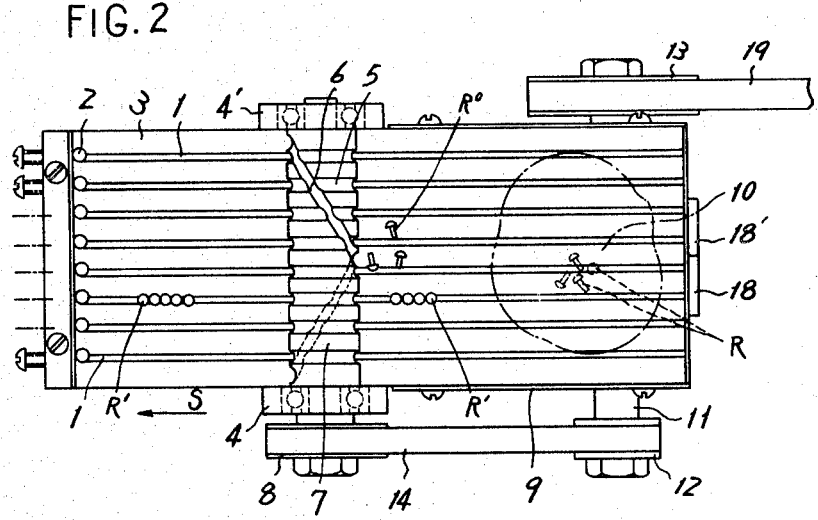

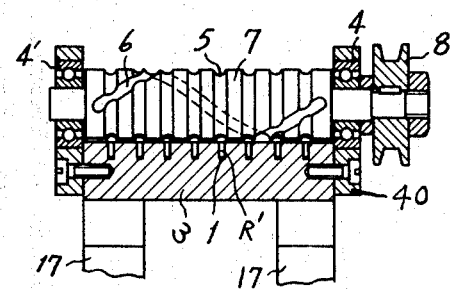
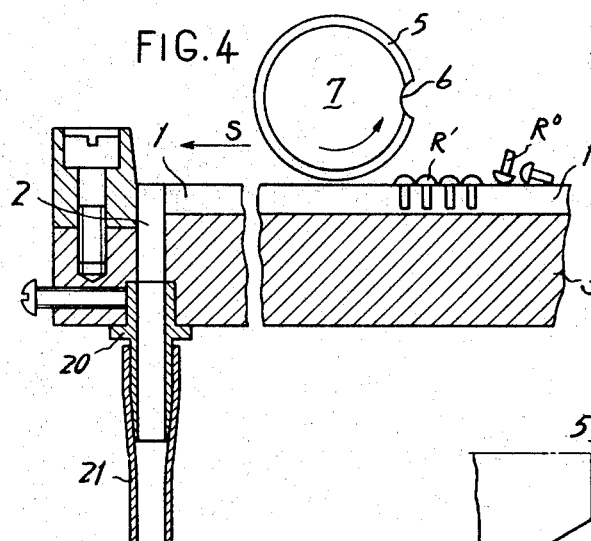
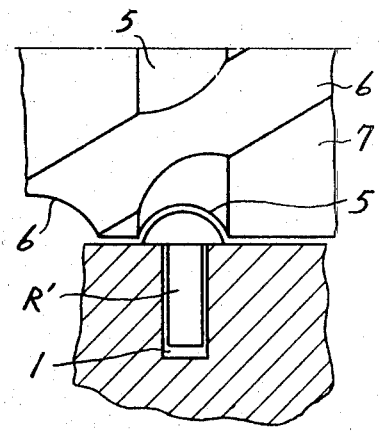
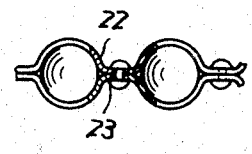

APPARATUS FOR ALIGNING AND CONVEYING RIVETS, SCREWS, BOLTS AND THE LIKE

This invention relates to a method and apparatus for aligning and conveying miniature articles, such as rivets, screws, bolts, etc., and is characterized in that such articles to be aligned and conveyed are scattered on the rear half of a conveying table and can pass through a recess between said table and a controlling roller only when they fall into straight indentations on said table. They are conveyed forward by the forward and backward reciprocal movement of the table and rotation of the controlling roller. The remaining articles are moved backwardly away from the roller and during succeeding advancing movements of the table, they are also caused to fall into the indentations and are aligned and conveyed forward.

In the manufacture of bearings, such as ball bearings, often the placing of rivets into the holes in the retainers is performed manually using pincers. This is particularly true in the construction of miniature ball bearings, in which the holes for the rivets are very minute. A good method has not been found for automatic positioning of minute articles such as rivets. It thus takes too much time to manufacture such bearings, mass production not being possible, and thus the manufacture of such bearings is very inefficient.

This invention relates to an improvement which overcomes such defects.

It is an object of this invention to provide a method and apparatus for conveying rivets, screws, bolts, etc. of small size, especially, e.g. a definite number of rivets necessary for assembling a ball bearing retainer, so that they are aligned in succession with the heads of said rivets in the desired position so that they can be inserted easily and promptly into minute holes in a bearing retainer.

According to the invention, a conveying table is provided having holes at one end to permit rivets or the like to fall therethrough, the holes each being at the end of a small groove in the table which is parallel to like grooves for holding on therein. At the rear of said table is a containing portion for holding on the table a group of definite articles such as rivets, bolts, etc. Means is provided for giving a reciprocating motion to the table to move the articles in an advancing direction. Above the surface of the conveying table is a rotatable controlling roller extending at right angles to said grooves, said roller having indented grooves on the circumferential surface thereof corresponding to the respective grooves in the conveying table.

In the operation of the above-mentioned apparatus, with the reciprocation of the conveying table and the rotation of controlling roller, of the group of rivets or other articles to be conveyed which are thrown on the rear half of the conveying table, only those that engage in the grooves will pass under the controlling roller and be conveyed in a line to the front portion of the conveying table, while the remaining articles are scattered to the rear on the rear half portion of the conveying table by the rotating motion of the controlling roller and the reciprocal movement of said table. Only those articles which engage in grooves will be conveyed successively as above-mentioned at the moment of the next advancement of the conveying table.

With this invention, for example, in the construction of retainers for ball bearings, inserting of a rivet through two plates can be easily and simply carried out once the rivets are aligned and conveyed to the desired position. Therefore, compared with hitherto known noneffectual and nonpractical methods, the efficiency increases with less manual labor, personnel expenses are lowered, and manufacturing costs are decreased, so that the practical value of the invention is great. Besides rivets, the invention can be applied to other articles such as screws, small bolts, etc. Since this invention makes it possible to make some steps in a manufacturing procedure automatic, it can be applied in many areas other than riveting ball bearing retainers.

Other objects and the construction of the invention will be more fully understood from the following description of a preferred embodiment of this invention, which is for conveying and aligning rivets, and which is shown in the accompanying drawings, in which:

FIG. 1 is a side elevation view, partially in section, of the apparatus according to this invention;

FIG. 2 is a plan view of FIG. 1;

FIG. 3 is a section along A-B line in FIG. 1, the controlling roller not being sectioned;

FIG. 4 is an enlarged diagrammatic sectional view showing the essential parts during operation of the apparatus of the invention;

FIG. 5 is an enlarged sectional view showing the relation between rivets in the grooves on the table aligned for being conveyed and the controlling roller having indented grooves and spiral grooves; and FIG. 6 is a sectional view of a part of a retainer for ball bearings, the steel ball bearing therein, and a rivet for connecting the parts of the retainer.

The apparatus has framework with spaced parallel side rails 40 having inwardly projecting rollers 41 thereon. A reciprocating conveying table 3 is positioned between the side rails 41 and has grooves in the opposite edges thereof into which the rollers 41 project, so that the table 3 can roll back and forth on rollers 41.

Between bearings 4 and 4' at the surface of the table 3 for conveying aligned objects is freely rotatably mounted a controlling roller 7 having grooves 5 in the circumferential surface thereof. The grooves 5 have a cross-sectional shape for receiving the objects to be conveyed, in this case the shanks of the rivets. The number and spacing of grooves 5 corresponds to grooves 1 in the surface of the table 3, the axis of roller 7 being at right angles to said grooves 1 and the surface of the roller being close to the surface of said table. A spiral groove 6 is provided around the circumferential surface of the controlling roller at a proper angle to the direction of the axis, and connects with grooves 5. A pulley 8 is mounted on one end of controlling roller 7. A container for rivets 10 is constructed by mounting circumferential walls 9 around the rear portion of the table 3. A shaft 11 is freely rotatably mounted at right angles to grooves 1 beneath the rivet container 10 on the table. A small pulley 12 is mounted on one end of a shaft 11 and a large pulley 13 is mounted on the other end of the shaft 11, and belt 14 extends between small pulley 12 and pulley 8 on said controlling roller 7. Belt 19 from a driving motor extends around pulley 13. In order that the reciprocal movement in the direction of horizontal advancing movement may be greater, a stand 15 is positioned directly under said table 3 parallel with said table and one end of each of two flat springs 16 and 17 is fixed to said stand 15 at an appropriate inclination. The other ends of the springs 16 and 17 are fixed to the bottom of table 3. Eccentric wheels 18 and 18' are fixed on shaft 11. Each of a plurality of pipes 21 is connected to a coupling 20 at the bottom of respective holes 2 in the table at the ends of the grooves 1. Each pipe 21 extends to a position of use of a rivet, for example, a hole 23 in a retainer 22, and is riveted by riveting apparatus (not shown here).

In operation, pulley 13 is rotated by transmission belt 19 from a motor (not shown), and small pulley 12 rotates on the end of axle 11 controlling roller 7, thus causing the surface of the roller 7 next to the tables to be rotated in the direction of the arrow, i.e. in a direction opposite to the advancing direction, at a definite speed through belt 14 from pulley 12. The eccentric rotation of eccentric wheels 18 and 18' due to the rotation of shaft 11 produces a reciprocal vibration causing vibration of the flat springs 16 and 17 and producing reciprocation of table 3 in the direction of arrow S because said springs 16 and 17 vibrate in the direction shown by the arrows Q. Accordingly, a group or rivets R thrown into the rivet container 10 on the table 3 advance on the table in the direction of arrows S, and some of the rivets R' have the shanks positioned in the grooves 1 and they advance automatically and in alignment. Only those rivets R' that are engaged in groove 1 can pass under controlling roller 7 and the other rivets R°, which are advancing on the table with their heads in disorder and which are not engaged in the groove of the table shown are blocked and thrown back in the opposite direction to advancing direction S owing to the rotation of controlling roller 7. The spiral groove 6 on the surface of controlling roller 7 engages the rivets R°, as shown in FIG. 4, due to the rotation in the direction of the arrow and they are thrown backward and are scattered. As a result, it is possible to prevent the surface of table 3 and grooves 1 from damage. Thus, only those rivets whose heads are aligned with grooves 1 and 5 can pass the controlling roller 7 and reach the holes 2 along straight groove 1 and fall down one by one through pipe 21. They reach rivet hole 23 in retainer 22 in position for riveting.

The means for reciprocating the table can be any means, such as magnetic means or other suitable means, and a proper amplitude and frequency per minute can be obtained by changing eccentric dimension of eccentric wheels, thickness and width of the flat springs and proper size pulleys.

While a preferred embodiment of the invention has been particularly described and illustrated by way of example in the drawings, it will be understood that modifications can be made in the construction and that the invention is limited only by the appended claims.

I claim:

1. An apparatus for aligning and conveying small articles such as rivets, bolts, screws and the like, comprising a frame, a table mounted on said frame for reciprocable movement in a generally horizontal direction, said table having a plurality of longitudinally extending grooves therein adapted to receive at least a part of the articles being aligned and conveyed in the desired position; a roller rotatably mounted above said table with the axis of rotation extending at right angles across said grooves, the surface of said roller being spaced from the grooved surface of said table a distance such that only articles properly positioned in said grooves can pass beneath said roller, the peripheral surface of said roller having grooves therein corresponding in number and spacing to the grooves in said table, said roller grooves having a cross-sectional shape for passing portions of said articles projecting above the grooved surface of said table, said roller further having a spiral groove therearound for catching articles on said table which are not in the grooves and impelling them in the direction opposite to the desired conveying direction; means for rotating said roller coupled to said roller with the peripheral surface of the roller adjacent the grooved surface of the table moving in a direction opposite to the desired conveying direction; and table reciprocating means coupled to said table for reciprocating said table for moving the articles in the desired conveying direction.

2. An apparatus as claimed in claim 1, further comprising a plurality of holes at the ends of said grooves in said table, and pipe means communicating with said holes for delivering said articles to a station for use.